(12) United States Patent
Dempsey

(10) Patent No.: US 11,874,009 B2
(45) Date of Patent: Jan. 16, 2024

(54) HVAC PERFORMANCE TRACKING SYSTEM AND METHOD THEREOF

(71) Applicant: Daniel J Dempsey, Carmel, IN (US)

(72) Inventor: Daniel J Dempsey, Carmel, IN (US)

(*) Notice: Subject to any disclaimer, the term of this patent is extended or adjusted under 35 U.S.C. 154(b) by 0 days.

(21) Appl. No.: 17/151,246

(22) Filed: Jan. 18, 2021

(65) Prior Publication Data

US 2021/0302043 A1    Sep. 30, 2021

Related U.S. Application Data

(60) Provisional application No. 63/002,104, filed on Mar. 30, 2020.

(51) Int. Cl.
| | |
|---|---|
| *F24F 11/38* | (2018.01) |
| *F24F 11/523* | (2018.01) |
| *F24F 11/64* | (2018.01) |
| *F24F 130/20* | (2018.01) |
| *F24F 110/22* | (2018.01) |
| *F24F 110/40* | (2018.01) |
| *F24F 110/12* | (2018.01) |

(52) U.S. Cl.
CPC ............ *F24F 11/38* (2018.01); *F24F 11/523* (2018.01); *F24F 11/64* (2018.01); *F24F 2110/12* (2018.01); *F24F 2110/22* (2018.01); *F24F 2110/40* (2018.01); *F24F 2130/20* (2018.01)

(58) Field of Classification Search
None
See application file for complete search history.

(56) References Cited

U.S. PATENT DOCUMENTS

| | | |
|---|---|---|
| 5,475,364 A | 12/1995 | Kenet |
| 7,444,251 B2 | 10/2008 | Nikovski |
| 8,068,997 B2 | 11/2011 | Ling |
| 8,606,554 B2 | 12/2013 | Zimmermann |
| 8,902,071 B2 | 12/2014 | Barton |
| 9,368,972 B2 | 6/2016 | Frampton |
| 9,429,961 B2 | 8/2016 | Sprinkle |
| 9,454,141 B2 | 9/2016 | Friedrich |
| 9,551,504 B2 | 1/2017 | Arensmeier |
| 10,001,289 B2 | 6/2018 | Mowris |
| 10,216,158 B2 | 2/2019 | Wacker |

(Continued)

*Primary Examiner* — Nathan L Laughlin
(74) *Attorney, Agent, or Firm* — Gutwein Law; Tyler B. Droste

(57) ABSTRACT

A system and method of monitoring the performance of an HVAC system including a controller in communication with an HVAC unit where the method includes monitoring environmental conditions using a controller. A target rate of change in indoor air temperature (IATR) can be established, and one or more adjusted environmental values can be adjusted to account for the adjusted IATR measurement. An adjusted IATR value can be established using one or more equations adjusting for a target sensible capacity value of one or more environmental factors in comparison to the measured sensible capacity of the one or more environmental factors to determine the adjusted IATR. The environmental factors can include but are not limited to the indoor air temperature, indoor humidity, outdoor air temperature, and any other measured parameter that could affect system capacity. The system can generate an alert when the adjusted IATR value reaches a pre-determined threshold.

15 Claims, 14 Drawing Sheets

(56) References Cited

U.S. PATENT DOCUMENTS

| | | | |
|---|---|---|---|
| 2003/0097875 A1* | 5/2003 | Lentz | G01F 1/6847 |
| | | | 73/204.26 |
| 2011/0218691 A1* | 9/2011 | O'Callaghan | G06Q 10/06 |
| | | | 700/295 |
| 2017/0293293 A1 | 10/2017 | Brownie | |
| 2017/0307243 A1* | 10/2017 | Burt | F24F 11/62 |
| 2019/0178519 A1* | 6/2019 | Kim | F24F 11/62 |
| 2019/0293313 A1* | 9/2019 | Reeve | F24F 11/38 |
| 2019/0293316 A1 | 9/2019 | Reeve | |
| 2021/0088390 A1* | 3/2021 | Kriss | F24F 11/63 |

* cited by examiner

| 24 Hour Rolling IATR | | | | | | | | | | |
|---|---|---|---|---|---|---|---|---|---|---|
| Variance = Var.P() Excel | | | Var = Var.P Excel Function | | | | | | | |
| | | | Measured Data Computations | | | Adjusted Data Computations | | | | |
| Date | Time | System Setting | Measured Hourly IATR | Measured Daily Rolling Avg IATR | Measured Weekly Rolling IATR | | | | Adjusted Hourly IATR | Adjusted Daily Rolling Avg IATR | Adjusted Weekly Rolling IATR |
| 5/16/2019 | 14:15:00 | off | | | | | | | | | |
| 5/16/2019 | 14:20:00 | cool | | | | | | | | | |
| 5/16/2019 | 14:25:00 | cool | | | | | | | | | |
| 5/16/2019 | 14:30:00 | cool | 9.819 | | | 0.860 | 0.757 | 0.823 | 5.256 | | |
| 5/16/2019 | 14:35:00 | cool | 8.571 | | | 0.837 | 0.807 | 0.828 | 4.792 | | |
| 5/16/2019 | 14:40:00 | cool | 9.129 | | | 0.813 | 0.870 | 0.828 | 4.765 | | |
| 5/16/2019 | 14:45:00 | cool | 6.600 | | | 0.802 | 0.913 | 0.828 | 4.003 | | |
| 5/16/2019 | 14:50:00 | cool | 6.600 | | | 0.802 | 0.930 | 0.828 | 4.076 | | |
| 5/16/2019 | 14:55:00 | cool | 6.600 | | | 0.808 | 0.917 | 0.836 | 4.086 | | |
| 5/16/2019 | 15:00:00 | cool | 6.600 | | | 0.813 | 0.893 | 0.844 | 4.049 | | |
| 5/16/2019 | 15:05:00 | cool | 6.800 | | | 0.825 | 0.870 | 0.852 | 4.037 | | |
| 5/16/2019 | 15:10:00 | cool | 6.800 | | | 0.831 | 0.860 | 0.852 | 4.202 | | |
| 5/16/2019 | 15:15:00 | cool | 6.900 | | | 0.819 | 0.877 | 0.852 | 4.260 | | |
| 5/16/2019 | 15:20:00 | cool | 6.960 | | | 0.808 | 0.910 | 0.852 | 4.008 | | |
| 5/16/2019 | 15:25:00 | cool | 6.400 | | | 0.802 | 0.937 | 0.857 | 3.863 | | |
| 5/16/2019 | 15:30:00 | cool | 6.000 | | | 0.808 | 0.937 | 0.862 | 3.801 | 4.231 | |
| 5/16/2019 | 15:35:00 | cool | 5.520 | 7.029 | | 0.808 | 0.917 | 0.868 | 3.275 | 4.162 | |
| 5/16/2019 | 15:40:00 | cool | 5.100 | 6.886 | | 0.813 | 0.893 | 0.868 | 2.773 | 4.070 | |
| 5/16/2019 | 15:45:00 | cool | 4.400 | 6.720 | | 0.819 | 0.877 | 0.868 | 3.560 | 4.039 | |
| 5/16/2019 | 15:50:00 | cool | 5.714 | 6.657 | | 0.819 | 0.887 | 0.868 | 4.280 | 4.062 | |
| 5/16/2019 | 15:55:00 | cool | 6.792 | 6.665 | | 0.808 | 0.923 | 0.868 | 4.466 | 4.075 | |
| 5/16/2019 | 16:00:00 | cool | 6.904 | 6.678 | | 0.784 | 0.977 | 0.868 | 4.458 | 4.085 | |
| 5/16/2019 | 16:05:00 | cool | 6.710 | 6.680 | | 0.773 | 1.013 | 0.868 | 4.114 | 4.096 | |
| 5/16/2019 | 16:10:00 | cool | 6.058 | 6.649 | | 0.767 | 1.000 | 0.868 | 3.874 | 4.096 | |
| 5/16/2019 | 16:15:00 | cool | 5.825 | 6.610 | | | | | | | |

Fig. 3C

HVAC PERFORMANCE TRACKING SYSTEM AND METHOD THEREOF

CROSS-REFERENCE TO RELATED APPLICATION

This U.S. Patent Application claims priority to U.S. Provisional Application 63/002,104 filed Mar. 30, 2020, the disclosure of which is considered part of the disclosure of this application and is hereby incorporated by reference in its entirety.

FIELD OF THE INVENTION

This invention relates generally to heating, ventilation, and air conditioning (HVAC) systems. In one aspect, the invention relates to a system and a method for monitoring a control system of an HVAC system to determine performance.

BACKGROUND

A HVAC (heating, ventilation, or air conditioning) system controls environmental parameters, such as temperature and humidity, of a residence. The HVAC system may include, but is not limited to, components that provide heating, cooling, humidification, and dehumidification. The target values for the environmental parameters, such as a temperature set point, may be specified by a HVAC owner.

In the HVAC industry, HVAC service providers and HVAC owners can encounter two different issues with their HVAC systems, besides immediate failure due to malfunction. The first being an HVAC system that gradually degrades, and the gradual loss of performance eventually becomes apparent to the HVAC owner when they notice that it is not heating or cooling adequately. The second issue being an HVAC system that does not cool adequately when hot weather arrives at the beginning of the cooling season or does not heat adequately when cold weather arrives at the beginning of heating season. In both cases, the HVAC owner calls for service after the problem has revealed itself, while a more intelligent approach would alert the HVAC owner and/or HVAC service provider of a problem before it is noticed.

The diagnostic testing of these issues can be more critical at the beginning of the heating or cooling season when the HVAC owner first turns on the air conditioning or furnace unit on for the first time to realize that it does not start that then results in a service call to the HVAC service provider for diagnosis and repair. Due to this highly common issue, HVAC service providers are overflowed with service calls to the point where there may be a significant delay in service or expensive after hour charges that may be incurred by the HVAC owner.

To attempt to remedy this situation, HVAC service provider attempt to offer pre-season service specials and/or incentives for preventative maintenance before the new heating/cooling season begins. However, these are not typically accepted by HVAC owners or they do not have the presence of mind to remember to enlist such services. As an alternative, certain HVAC companies and service providers offer instrumentation package, such as the Sensi Predict by Emerson, or attempt to sell a more expansive system that has built-in sensors that detect loss of performance, such as the Carrier Infinity® 20 Air Conditioner with Greenspeed® Intelligence. These systems constantly monitor system performance and can alert the homeowner or dealer of a problem. These systems, however, are quite costly, and some charge a monthly monitoring fee.

Similarly, some manufactures try to use various methods to predict potential product failures by monitoring and/or tracking the rate of change of the indoor air temperature when the HVAC system is operating, ("IATR"). When an HVAC system approaches peak load operation (i.e., at very high outdoor air temperatures in cooling, and very low temperatures in heating), the system reaches a stable condition where the IATR is zero and the system runs constantly. Conversely, when the system is operating constantly at less than peak load, an IATR value of zero or less can signify a performance problem and trigger an alert to the homeowner or contractor.

The challenge in tracking IATR is that, at part load, the HVAC system cycles ON/OFF under a wide range of environmental conditions and produces a varying degree of IATR. This varying amount of IATR change rate causes scatter and makes tracking system performance degradation difficult, other than when IATR reaches zero. Thus, the individual IATR data points must be averaged over a period of time, typically over days or weeks, so as to establish a trend. However, many of the current systems do not account for other possible variables or include a range of various environmental conditions when correcting the IATR and similarly are unable to accurately correct for these variables when predicting performance degradation.

Continuous and ongoing monitoring of an HVAC system can help HVAC owners assess the HVAC systems health and potentially aid in predicting or identifying when the HVAC system is starting to degrade. If degradation is realized, a HVAC owner/user can make a service call to and HVAC technician or service provider to remedy and potential issues with the HVAC system before a complete HVAC failure regardless of the seasonal changes. There exists a need to accurately monitor the performance of an HVAC system to effectively track and alert a HVAC owner or service provider of an imminent system performance problem using only a Wi-Fi enabled thermostat and without the need of additional costly instrumentation packages or advanced HVAC controls. The present disclosure provides a system and improved method for monitoring the performance to help identify performance loss in order to alert a HVAC owner or service provider of such loss that may require immediate action to be taken or alternatively signal a precautionary warning of declining performance.

BRIEF SUMMARY OF THE INVENTION

In one aspect, the present disclosure is related to a method of monitoring and/or determining the degradation of an HVAC system. One or more controllers can record or determine various data elements in during a prescribed time period or interval. In some embodiments, the data elements can include outdoor air temperature, indoor air temperature, indoor air temperature rate, indoor relative humidity, system on or off status, system cycle (i.e. heating or cooling), airflow, outdoor humidity, barometric pressure, wind, solar irradiance, among others. The controller can include a sensor for obtaining the measurement or be communicatively coupled to one or more sensors to collect the data elements. The IATR can be computed from one or more data elements or measured by the controller or a sensor. The controller can utilize one or more adjustment factors to calculate and determine an adjusted IATR value (IATRadj). In some embodiments, the adjustment factors can be determined by solving for one or more constants during an initial baseline period or interval. The IATRadj value can be plotted or monitored to aid in predicting a HVAC system failure or degradation. A threshold value for the IATRadj can be established or set, wherein if the measured IATRadj value reaches the threshold value, the system can trigger an alert to a user or device. In some exemplary embodiments, the system may require the measured IATRadj value to be at the or exceed the threshold value for a period of time or interval before triggering an alert. The alert can be communicated in any suitable means, including but not limited to a graphical user interface such as a computer monitor or smart phone, a text, email, call, audio alert, or any other suitable means. Additionally, the alert can be transmitted to a user to inform them of the HVAC status and potential service issue or maintenance check of the HVAC system. Similarly, the controller can generate a one or more reports or graphical charts to illustrate the tracking of the IATRadj and other data elements of the system.

In another aspect, this disclosure is related to a method of monitoring the operation and performance of an HVAC system where the method includes continuously monitoring the indoor air temperature (IAT) for a first period of time or interval and making one or more arithmetical adjustments based upon one or more environmental factors that can include indoor air temperature, indoor humidity (relative and/or absolute), outdoor air temperature, airflow, outdoor humidity, barometric pressure, wind, solar irradiance or other environmental factors for a period of time. The HVAC system can include a controller communicatively coupled to an HVAC unit to measure the various environmental factors. Additionally, the HVAC controller can be communicatively coupled to a monitoring system controller that can be configured to analyze the variables to generate corrected IAT values based upon the one or more measured variables using on or more algorithms.

In another aspect, this disclosure is related to a method of monitoring the operation and performance of an HVAC system including a controller in communication with an HVAC unit where the method includes monitoring environmental conditions using a controller. A target indoor air temperature (IAT) can then be established as a reference condition. One or more adjusted environmental values can be adjusted to account for the adjusted IAT measurement. An adjusted IAT value can be established using one or more algorithm modules adjusting for sensible capacity at the target IAT in comparison to the sensible capacity at the measured IAT. Similarly, in some exemplary embodiments, total capacity may be used for determining the IATR in addition to or in place of the sensible capacity. The IATR value can be adjusted by iterating adjustment factors of one ore more algorithms to minimize the IATR variance over a pre-determined period of time. One or more other adjustment factors can be calculated including but not limited to the indoor humidity, outdoor air temperature, and any other measured parameter that could affect system capacity (airflow, outdoor humidity, barometric pressure, wind, solar irradiance, among others).

In yet another aspect, the present disclosure provides a method for monitoring HVAC system performance and determining potential failure of the HVAC system using a thermostat having a transceiver for communicating with a wireless network to a monitoring system comprising a monitoring system controller. The method can include first operating an HVAC system using the HVAC controller, wherein the HVAC controller can be any suitable means computer, "smart" thermostat, or remote controller communicatively coupled to the HVAC system. In some exemplary embodiments, the HVAC controller can be communicatively coupled to or include a processing means and memory. In other embodiments, the smart thermostat can operate as the HVAC controller. Additionally, the system controller can include a transceiver capable of connecting to a network, such as a wireless network and be communicatively coupled to the monitoring system controller. A baseline HVAC system performance value for one or more environment variables can then be generated through communicating pre-determined manufacturer performance data to the thermostat or by initiating a baseline value determination program by the system controller, which can operate the HVAC system for a pre-determined interval of time to establish the baseline HVAC performance values. In some exemplary embodiments, the HVAC controller can include or be communicatively coupled to at least one sensor for collecting a data values for one or more environmental factors at a prescribed interval. In some exemplary embodiments, a "smart" thermostat can operate as both the HVAC controller and the monitoring system controller. It is understood that in some embodiments, the HVAC system can include more than one HVAC controller. A monitoring system controller can then generate an adjusted IATR value for the pre-determined time interval based upon the collected data values of the environmental factors during the prescribed interval. The monitoring system can then analyze the adjusted IATR values in reference to the HVAC system performance values at one or more prescribed intervals. These adjusted IATR values can be plotted over a timeline to monitor for any potential degradation of the system. Additionally, if the adjusted IATR value reaches a certain threshold value, the monitoring system can initiate an alert to a user using any suitable method. In some embodiments, the alert can be a text, email, alarm, or other notification. In some embodiment, the alert can be transmitted to a user devices or graphical display, such as a smart phone, tablet or computer. In addition to being obviously visible to an HVAC contractor monitoring the system, an alert signal can also be generated and/or communicated if the if the IATR value falls outside a predetermined performance tolerance threshold value.

In another aspect, the invention relates to a method for monitoring HVAC system performance and determining potential failure of the HVAC system using a monitoring system controller communicatively coupled an HVAC system comprising first initiating a performance evaluation/calibration cycle to monitor the operation of an HVAC system using a monitoring system controller. The monitoring system controller can then obtain environmental data from at least one sensor or database communicatively coupled to the monitoring system controller. The monitoring system controller can then generate a rate of temperature change (IATR) value during a pre-determined baseline time interval. The monitoring system controller can then generate an adjusted rate of temperature change (IATRadj) values at pre-determined time intervals during the performance evaluation cycle using one or more performance analysis algorithms and at least one of the following: obtained environmental data; historical system performance data; or system performance product data. The monitoring system controller can then alert a user when the IATRadj value reaches a pre-determined value threshold.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 3A is a table providing raw data obtained and representative calculation outputs using an exemplary method of the present disclosure using a rolling hourly average.

FIG. 3B is a table providing raw data obtained and representative calculation outputs using an exemplary method of the present disclosure using a cycle average.

FIG. 3C is a condensed table providing representative calculation outputs using an exemplary method of the present disclosure using a cycle average.

DETAILED DESCRIPTION OF THE INVENTION

Figure 1A:
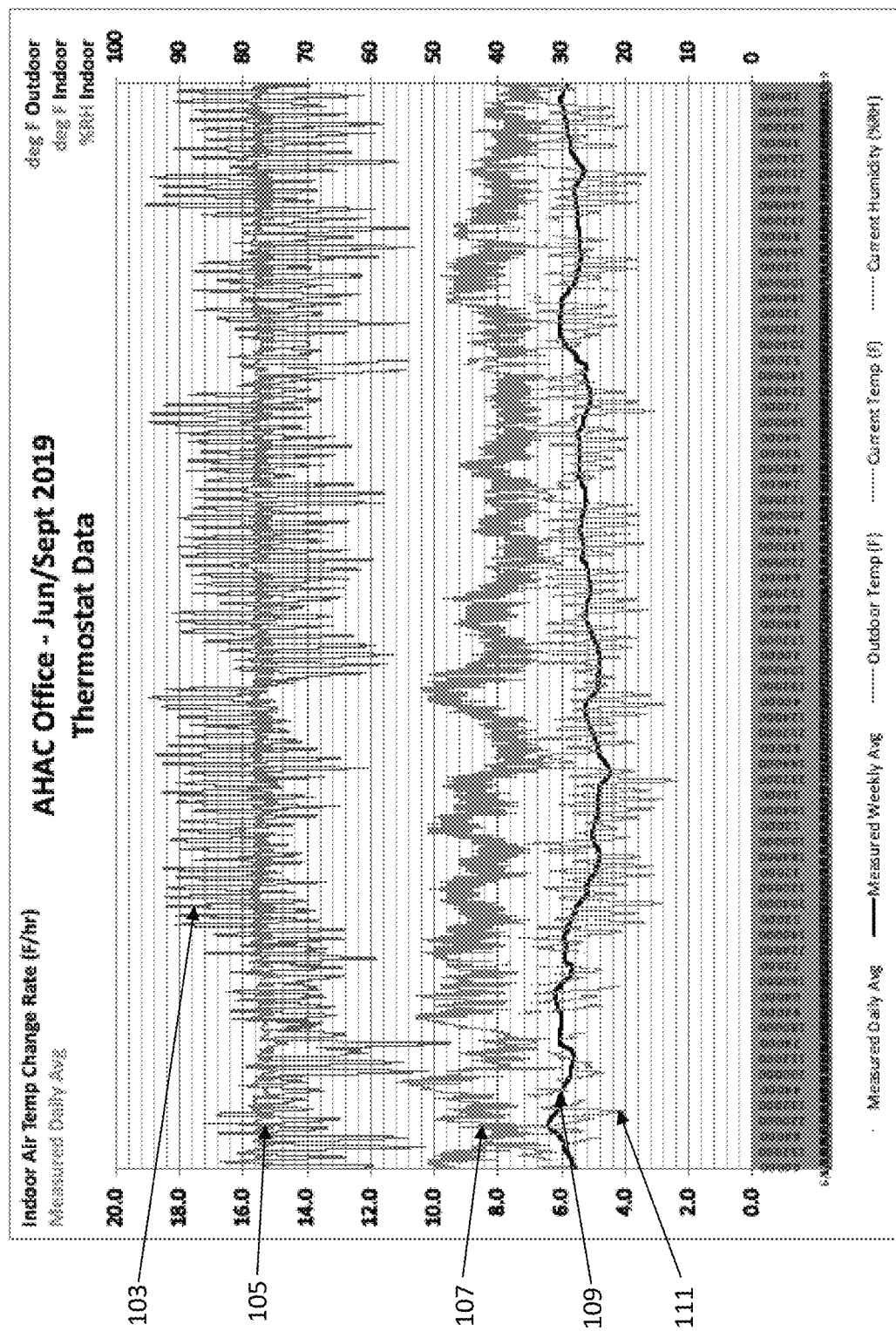
FIG. 1A is a diagram of IATR measurements and the rolling 12-hour average of the IATR.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

When an HVAC system approaches peak load operation (i.e., at very high outdoor air temperatures in cooling (negative rate of change), and very low temperatures in heating (positive rate of temperature change)), the system reaches a stable condition where the rate of change of indoor air temperature (IATR) is zero or less, on an absolute basis, and the system runs constantly. Conversely, when the system is operating constantly at less than peak load, an IATR value of greater or less can signify a performance problem and trigger an alert to the homeowner or contractor.

The challenge in tracking IATR in traditional systems is, at part-load, the HVAC system cycles ON/OFF under a wide range of environmental conditions and produces a varying degree of IATR. This varying amount of IATR change rate causes scatter and makes tracking system performance degradation difficult, other than when IATR reaches zero. Thus, the individual IATR data points must be averaged over a period of time, typically over a day or week or even over more than a day or week, so as to establish a trend. Similarly, systems relying simply upon measured IATR may have false degradation detections or may not produce ongoing values that can be reliable in predicting system performance and degradation even if averaged over a period of time.

Figure 1B:
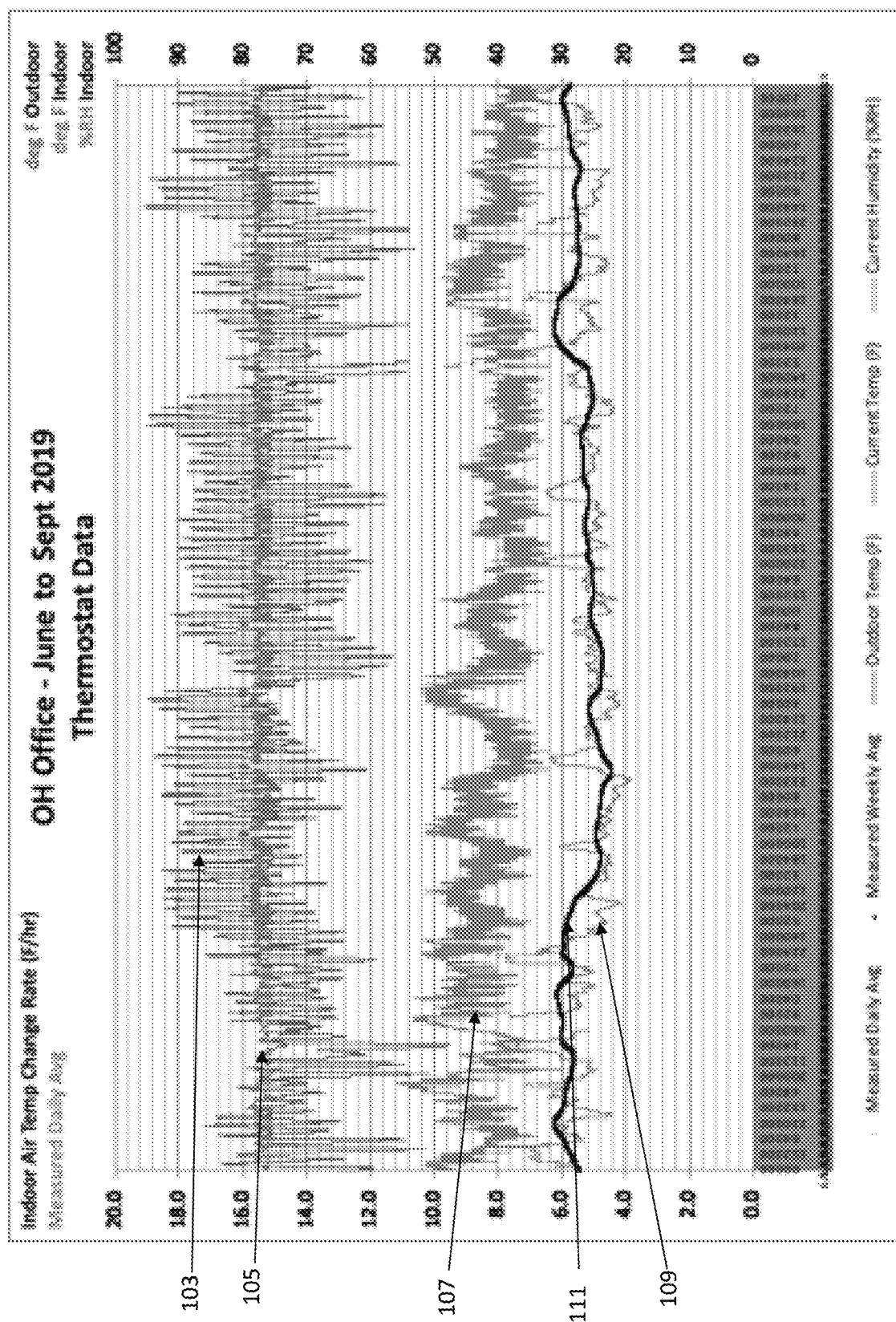
FIG. 1B is a diagram of IATR measurements and the rolling daily 24-hour average of the IATR.

FIGS. 1-2 illustrate two examples of the variability of an IATR measurement, one from ongoing tracking data and another from single-point test runs that can occur multiple times. FIG. 1A is of a HVAC system in the summer months located in the Midwest using a 12-hour rolling average, while FIG. 1B uses a 24-hour rolling average. The graphs in FIGS. 1A-B illustrate the changes in outside air temperatures (OAT) 103, the indoor air temperature (IAT) 105, the percent of relative humidity (% RH) 107, the IATR 109, and the weekly average line of the IATR 111 over a period of time. The central curve 107 illustrates the % RH, while the upper two curves illustrate the OAT 103 and the IAT 105. As shown, the OAT 103 has greater variability and temperature swings given due to the temperature swings between daytime and nighttime, while the IAT 105 remains fairly stable. The lower two curves provided illustrate the rolling daily average IATR 109 that shows greater variance over time, while the more solid line with less variability is the weekly average of the IATR 111.

Figure 2A:
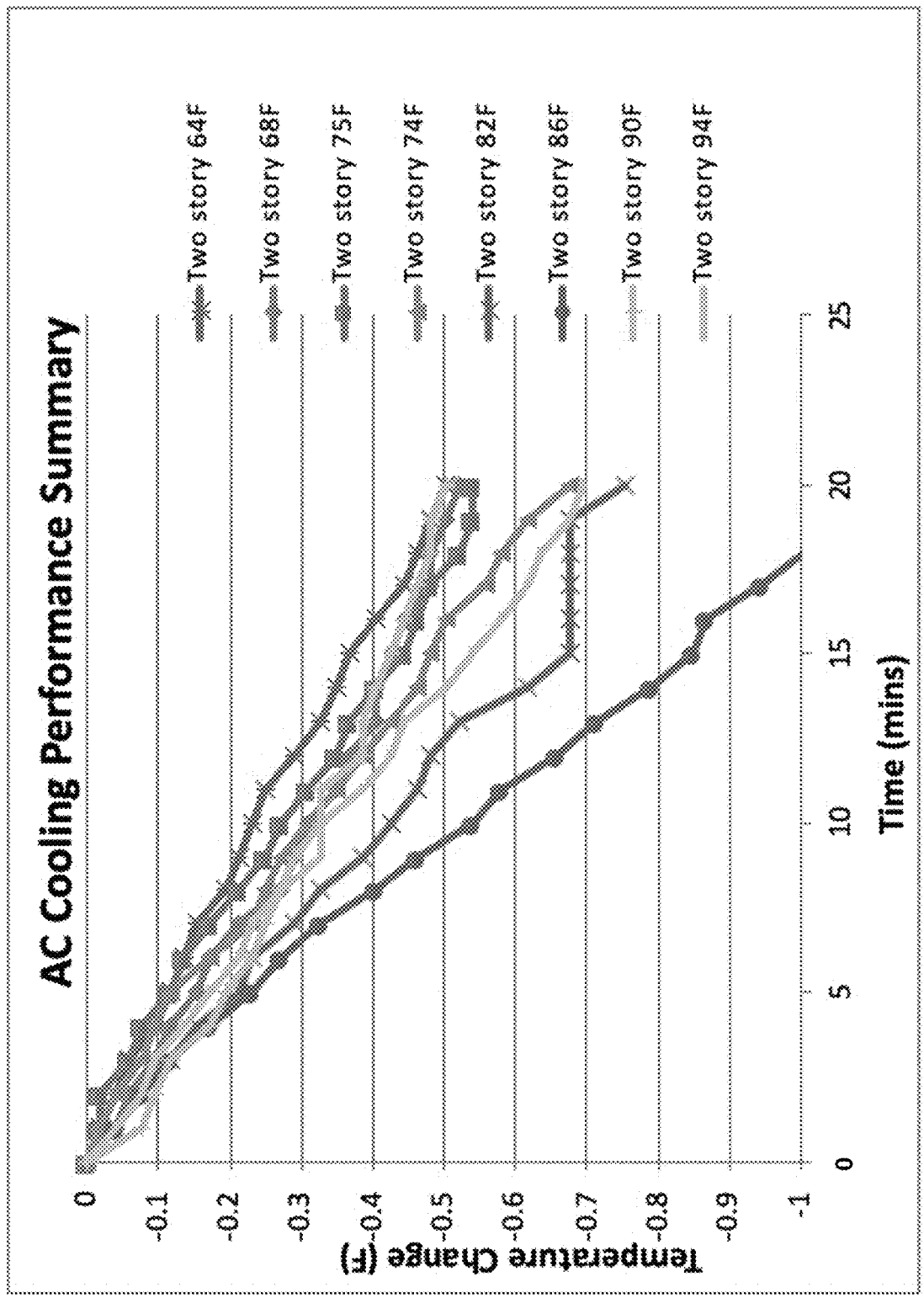
FIG. 2A is a diagram illustrating the change in indoor temperature during a test run on different days of a single-family home.
Figure 2B:
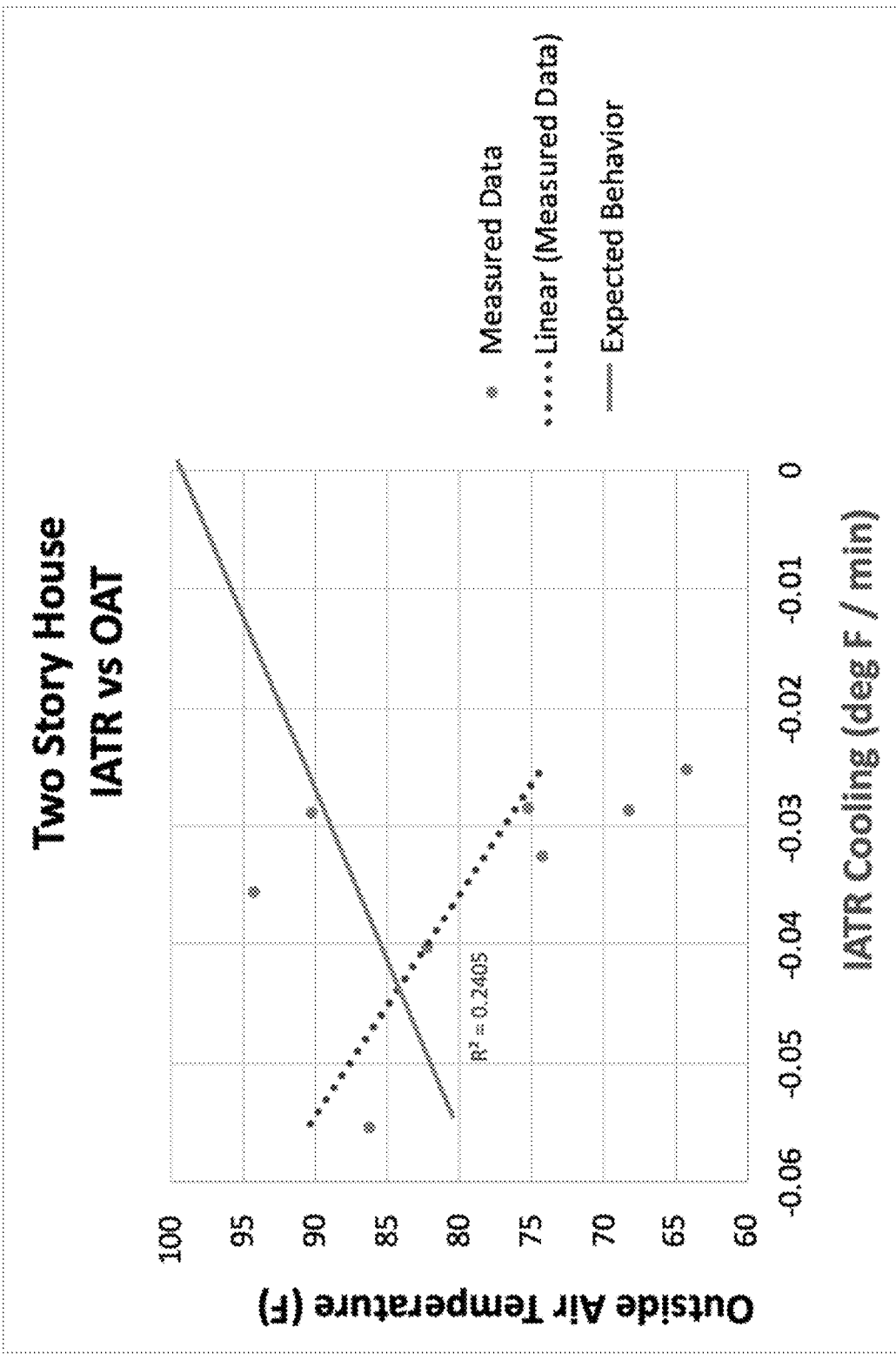
FIG. 2B is a diagram illustrating the rate of change in indoor temperature versus outdoor air temperature during a test run on different days of a single-family home.

FIG. 2A illustrates the change in indoor temperature during a 20-minute test run on different days on a single-family home. In both cases, the range of variation from maximum to minimum IATR (rate of indoor air temperature change while the system is ON) is significant. FIG. 2B illustrates the rate of change of indoor temperature vs. the outdoor air temperature during a 20-minute test on different days on a single-family home. If the variation in IATR was solely due to outdoor air temperature, the measured data would fall on a line that eventually intersects zero IATR at increasing outdoor temperature. Unlike the anticipated correlation, FIG. 2B illustrates that the rate of change of the temperature does not directly correlate with the OAT illustrating that there are additional variables that can affect the IATR.

The system and method of the present invention monitors the rate of change of the indoor temperature (IATR) while the system is operating, which may be affected by multiple environmental factors including but not limited to humidity and indoor temperature, as well as outdoor air temperature. By adjusting the measured IATR values for the impact of these environmental factors, the variation/scatter in the IATR can be reduced to provide a more constant metric over a period of time. This method applicable for various types of monitoring systems, including continuous HVAC system monitoring system that constantly monitor the health and efficiency of the HVAC system. Once a stable IATR metric is established a user and/or HVAC service provider can better more effectively and quickly identify changes in performance over time.

In its most basic form, the adjusted IATR herein referred to as IATRadj can be calculated as expressed in below Equation 1.

$$\text{IATRadj} = \text{IATRmeasured} * f(\text{IAT}, \text{IDRH}, \text{OAT}) \quad \text{Equation 1:}$$

where IAT represents the measured indoor air, IDRH corresponds to the indoor humidity, and the OAT is the outdoor temperature.

The present disclosure provides a number of ways to appropriately adjust the IATR value. One exemplary embodiment can utilize product performance data provided by manufacturers or third parties in which the system can compute an adjustment factor. In another exemplary embodiment, the IATRadj can utilize measured and/or historically measured data stored on the memory to solve for adjustment factors for various data elements (i.e. OAT, IAT, IDRH, etc.) that can provide for a minimal amount of IATR variance over a period of time. The measured data can be obtained during a prescribed interval to establish a corresponding adjustment factor for the individual data values. In some exemplary embodiments, this can include adjustment factors for the data elements IAT, OAT, and IDRH, wherein one or more of the adjustment factors from the data elements can be used to calculate and determine an IATRadj value. Similarly, the system of the present invention can generate a dynamic computer model of the computed IATR that can then be used to predict future changes in IATR based upon one or more variables, such as product performance under different environmental conditions. The dynamic modelling can alert a user of a predicted failure or service date. In some exemplary embodiments, the historical data can be from the tested HVAC system or alternatively could be historical measured HVAC data of similar system in similar climates that have been obtained by the system for additional reference. In some exemplary embodiments, the adjustment factors can be calculated utilizing measured data from the HVAC system. The system can also plot the IATRadj values over a timeline to monitor for any potentially gradual degradation of the HVAC system over time based upon the IATRadj values.

The system or user can provide reference/target conditions for the HVAC system in accordance with a number of factors. These reference points can be determined or changed by a user based upon the geographic location for which the system is located as well as the user's ideal indoor temperatures and humidity. They can also be correlated to the historical average data for the specific geographic location. For example, a HVAC unit in Ohio in July may typically have reference conditions set at 72° F. for an indoor temperature and the average outdoor temperature for the month may be 85° F. with a 50% relative humidity within the structure, while a HVAC system in Florida in July may have a 72° F. for an indoor temperature and the average outdoor temperature for the month may be 95° F. with a 55% relative humidity within the structure. These reference values can change depending upon location of the system or alternatively may be used as a standard reference value for all HVAC systems regardless of the climate the HVAC system is located. In some exemplary embodiments, the monitoring system can utilize a database to determine the appropriate reference values to be used depending upon the HVAC system type and location of the HVAC system. Alternatively, a user can set the reference values as desired.

An evaluation period can be established to obtain HVAC performance and/or environmental factor data points, such as measured IATR, IAT, IDRH, and OAT values among others that can be used as baseline or calibration data. The evaluation period could be based upon a prescribed time period or interval, such as between about 1-8 weeks, or about 2-6 weeks, or about 4 weeks of monitoring the HVAC system. Similarly, the period could be based upon a number of HVAC cycles, such as between about 50-300 cycles, or about 100-200 cycles, or about 150 cycles. Alternatively, the period could further be defined to require HVAC operation reach a certain threshold number of cycles or defined amount of HVAC system runtime, including but not limited to any number of cycles until and IATRadj variance value limit is reached. In some exemplary embodiments, the evaluation period could be between about 5 to about 50 hours of HVAC run time, or about 10 to about 30 hours of HVAC run time. During the prescribed baseline/calibration period, the system can record the data points for the system, which can then be utilized to compute variance for each of the data points to establish a request adjustment factor which can be used to minimize variance of the system for the adjusted IATR value. The data points can be stored on a local or virtual memory such as a server. These adjustment factors can be utilized to determine the IATRadj until a recalibration of the system is required, which may be due to system maintenance or changes in external variables (i.e., window treatments, added insulation, etc.).

One exemplary method utilizing product performance data can adjust IATR for varying indoor air temperature, indoor humidity and outdoor air temperature. The performance data can be provided to the systems controller via a cloud database or stored on a memory and be provided from a manufacturer's published product data, or from performance data stored in system memory. In some embodiments, IATR can be set to be a direct function of system capacity, such as the total or sensible capacity, and can use performance data to generate relationships that adjust the measured IATR and account for the changing variable. This method assumes the system performs the same in actual use as in the rating laboratory, and that such data is readily available. Various installation and operation conditions may change actual field performance from the rating laboratory. These conditions may include longer/shorter refrigerant lines, voltage variation, non-matched indoor evaporator coils, solar load on the outdoor unit, incorrect components (capacitor, motor, etc.), as well as other variables. In addition, published data that accounts for these variables may not be readily available for all systems, particularly ones that have been in operation for a period of time.

The impact of any one given measurable parameter may be determined from the performance data. Sensible capacity at the measured parameter can be computed as would the sensible capacity for an arbitrary target parameter. In one exemplary embodiment, this parameter can be indoor air temperature. The system can use this data to determine the IATadj value using the ratio of the sensible capacity at the target value divided by the sensible capacity at the measured value, as exhibited in equation 2 where the parameter measured is indoor air temperature:

$$\text{IATadj} = \text{Sensible capacity at target IAT/sensible capacity@measured IAT.} \quad \text{Equation 2:}$$

A similar calculation would be done for indoor humidity, outdoor air temperature, and any other measured parameter that could affect system capacity (airflow, outdoor humidity, barometric pressure, wind, solar irradiance, and so on). See Equations 3 and 4:

$$\text{IDRHadj} = (\text{Sensible capacity@target IDRH})/(\text{sensible capacity@measured IDRH}); \quad \text{Equation 3:}$$

$$\text{OATadj} = (\text{Sensible capacity@target OAT})/(\text{sensible capacity@measured OAT}) \quad \text{Equation 4:}$$

The adjustment factors can then be used to compute an adjusted IATR value as shown in $$\text{IATRadj} = \text{IATadj} * \text{IDRHadj} * \text{OATadj} * \text{IATRmeasured} \quad \text{Equation 5:}$$

Where, IATRadj is the IATR for a given set of data that is adjusted to target values of IAT, IDRH and OAT. The individual IATRadj values can be averaged and plotted over time to discern performance trends of the HVAC system. IATadj is can be represented as a decimal fraction for the impact on system performance of the actual indoor air temperature in comparison to a target value. A fraction less than one means the IATR will be less when operating at the target IAT value; a fraction greater than one means the IATR will be greater when operating at the target IAT value. IDRHadj can be represented by a decimal fraction for the impact on system performance of the actual indoor humidity in comparison to a target value. Similarly, a fraction less than one means the IATR will be less when operating at the target IDRH value; a fraction greater than one means the IATR will be greater when operating at the target IDRH value. OATadj can be represented as a decimal fraction for the impact on system performance of the actual outdoor air temperature in comparison to a target value. A fraction less than one means the IATR will be less when operating at the target OAT value; a fraction greater than one means the IATR will be greater when operating at the target OAT value.

In an alternative or an additional exemplary method, a single multi-variate equation could be used to estimate system performance as a function of IAT, IDRH and OAT (or any other measurable system performance parameter).

The equation for system capacity could take the following form when adjusting for indoor air temperature, indoor humidity and outdoor air temperature using $$\text{Capacity} = A*(\text{IAT})^2 + B*(\text{IDRH})^2 + C*(\text{OAT})^2 + D*(\text{IAT}*\text{RH}) + E*(\text{IAT}*\text{OAT}) + F*(\text{IDRH}*\text{OAT}) + G \quad \text{Equation 6:}$$

A single IATR adjustment factor, IATRadj, can be determined by the ratio of the capacity at the target conditions and the capacity at measured conditions. The equation constants, A through G, could be determined using a number of methods including, but not limited to best fit mapping to historical data, or provided by a system manufacturer based on laboratory test data for the HVAC unit. In some exemplary embodiments, the constants may be solved utilizing an algorithm implemented by the system using any suitable measure including but not limited to manufacture test data, historical data, measured system data, or predictive data for the HVAC system. A computing means can be used by a controller to map the data points to generate the values of the adjustment factors. Similar to other methods of the disclosure, the solved constants/adjustment factors can be based on actual operation and can provide a better representation of performance than the laboratory derived values. These adjustment factors can be established from measurement of the values over an evaluation period of the HVAC system.

Another exemplary method of the present disclosure can include a method in determining the adjustment of the IATR by iteratively solving for the individual adjustment factors to minimize the variance of IATRadj over a baseline time period, such as an evaluation period. In some exemplary embodiments, the adjustment factors can be solved for IAT, OAT, and IDRH. This method may presume that there are no system performance defects during the baseline period. In some exemplary embodiments, the baseline can start a first cycle after a prescribed number of days of no cooling or heating operation, or alternatively can begin a first cycle after OAT exceeds a minimum temperature. Similarly, the baselining period can additionally be established at any other intervals desired by a user. Once a system is commissioned and adjustment factors are set, any significant increase in variance from the prior trend could suggest performance loss and potential failure prediction or service requirement. Measured historical data based upon the performance loss based on similar measured historical data using geographic location and climate data could use the system controller to extrapolate out a potential failure date or service date. This method requires multiple measurements over time so that variance can be computed. This method can also be used at the startup phase to establish initial adjustment factors until enough data is available to further carry out the requirement of this method. The system can generate an alert that can be communicated to a user using any suitable means, such as through graphic user interface or email alert.

In some exemplary embodiments, a system controller can operate the HVAC system and also monitor the operation of the HVAC system. In some embodiments, the HVAC system can have two separate controllers, a HVAC system controller configured to operate the HVAC system and a monitoring system controller for monitoring the performance of an HVAC system. The monitoring system controller can be communicatively coupled to the HVAC system controller. In some embodiments, the monitoring system controller can be a cloud-based application communicatively coupled to the HVAC system and one or more sensors or databases to collect values of environmental factor variables and performance data to monitor the function and performance of an HVAC system. The monitoring system controller can be communicatively coupled to one or more sensors, such as a "smart" thermostat to collect operational data of the HVAC system as well as environmental variables, such as temperature and humidity during the operation of the HVAC system. In some embodiments, a "smart" thermostat or thermostat having a transceiver capable of communicating over a wired or wireless network can operate as both the HVAC system controller and a sensor. While the HVAC system may cycle on and off, the monitoring system controller can be continuously in operation to collect various data and information of the conditioned environment.

In one exemplary method of computing the adjustment factors can use the following equations:

$$IATadj=1-(IATact-IATtarget)*IATfactor, \quad \text{Equation 7:}$$

$$IDRHadj=1-(IDRHact-IDRHtarget)*IDRHfactor, \quad \text{Equation 8:}$$

$$OATadj=1-(OATact-OATtarget)*OATfactor. \quad \text{Equation 9:}$$

The IATfactor, IDRHfactor and OATfactors are sensitivity factors representing the impact of each parameter on IATR. They would be iteratively adjusted, thus computing IATadj, IDRHadj, OATadj and IATRadj for each set of data. The iteration continues until the IATRadj variance over a predetermined period of time is minimized.

In one example for illustrative purposes, a single line of data at one period of time where indoor temperature is 74 F, indoor humidity is 55%, and outdoor temperature is 78° F. can be used. The target values in which IATR is adjusted to 72° F. indoor, 50% humidity and 85° F. outdoor. The Equations 10-12 used to compute one or more adjustment factors for sets of individual data can be as follows:

$$IATadj=1-(IATact-IATtarget)*IATfactor= \\ 1-(74-72)*IATfactor=1-2*IATfactor; \quad \text{Equation 10:}$$

$$IDRHadj=1-(IDRHact-IDRHtarget)*IDRHfactor=1- \\ (55-50)*IDRHfactor=1-5*IDRHfactor; \text{ and} \quad \text{Equation 11:}$$

$$OATadj=1-(OATact-OATtarget)*OATfactor=1-(78- \\ 85)*OATfactor=1+7*OATfactor \quad \text{Equation 12:}$$

Figure 3A:
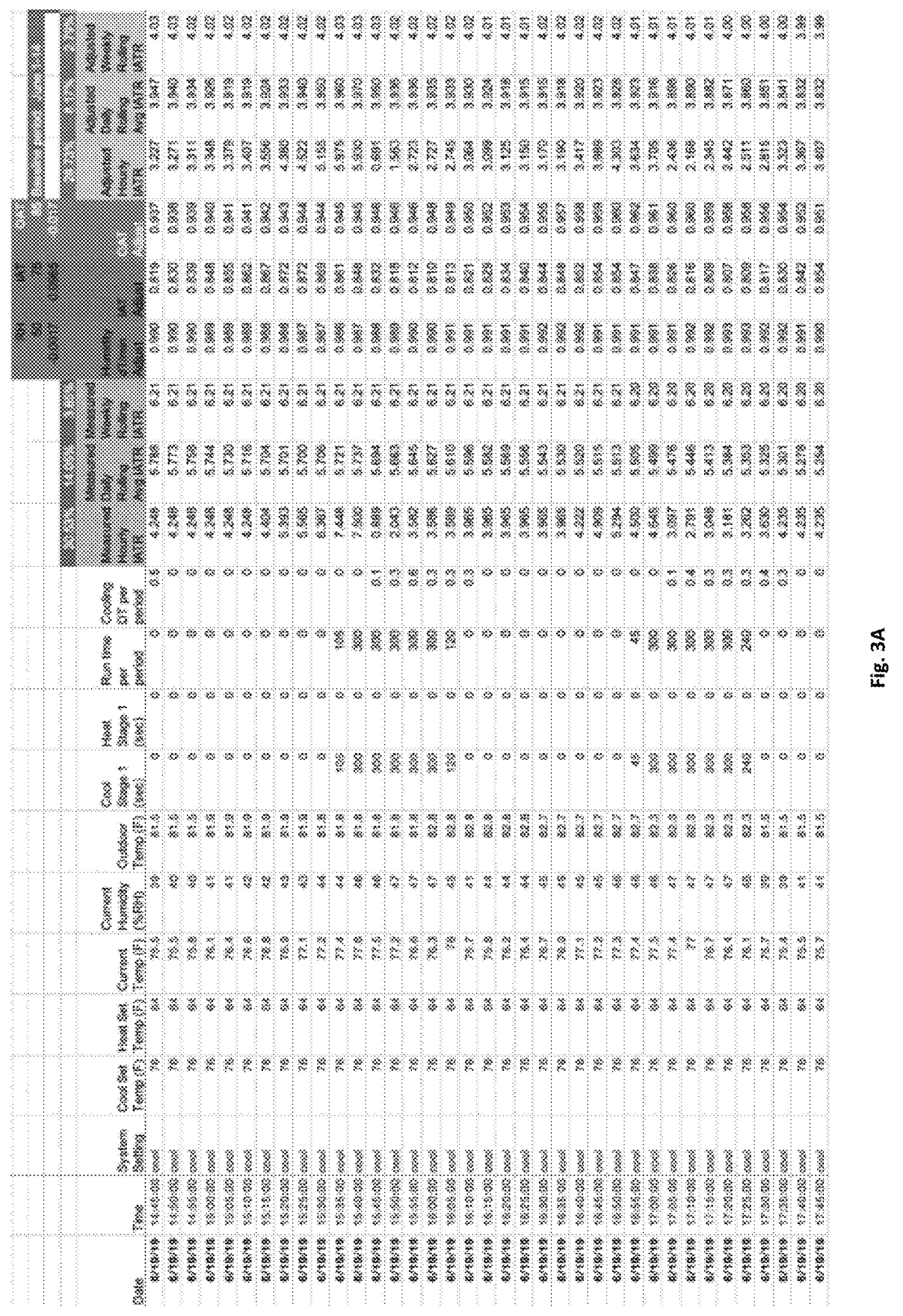
Figure 3B:
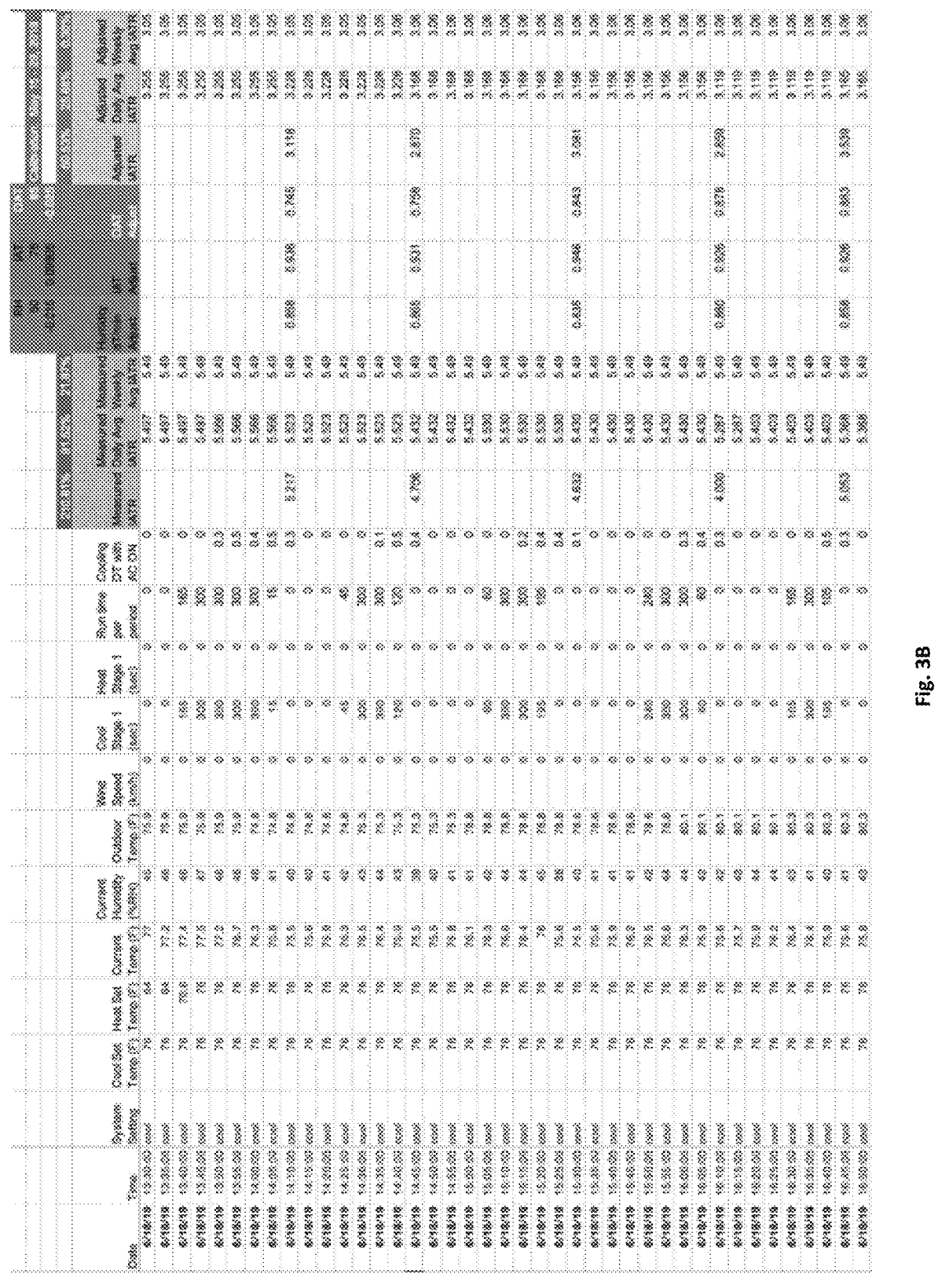

Values for the three factors (IATfactor, IDRHfactor, OATfactor) can be iterated in a multi-variate solution process to achieve the IATRadj solution that results in the least variance. FIG. 3A provides a representative calculation output for various data elements using the above method. In some exemplary embodiments, the target/reference values can be about 50% Relative Humidity, 72° F. Indoor Air Temperature, and 85° F. Outdoor Air Temperature. The chart illustrates a number of values recorded by the system including but not limited to measured IATR values, averaged over an hour, day and week, respectively. The adjusted IATR values for the hourly, daily and weekly average can be obtained, stored, and adjusted to 50% Relative Humidity, 72° F. Indoor Air Temperature, and 85° F. Outdoor Air Temperature. In addition to using a rolling average method for determining the adjusted IATR values, another exemplary method could additionally calculate the adjusted IATR for each individual IATR cycle of the HVAC system as shown in FIG. 3B. In this method, each time the HVAC system would initiate a cycle (heating or cooling) the adjusted IATR can be obtained and stored to the system. Applications utilizing the cycle based adjusted IATR method can additionally allow for the use of an alert level to by set by a user, wherein the system can alert a user if the adjust IATR for a particular cycle is not within a threshold value or above or below a pre-determined alert level. FIG. 3C provides a condensed chart showing the various adjustment factors and measure IATR and adjusted IATR measurements for a continuously monitored system. The chart provides data that may be stored and/or transmitted to a user through a display. As shown, one or more of the adjustment factors can be determined and presented. Similarly, the graph may present the baseline interval used for determining the adjustment factors.

Additionally, the charts in FIG. 3A provide the target indoor humidity, the IDRH factor, and resulting IDRHadj values by row of five-minute thermostat data obtained. Also, illustrated is the comparable information for indoor temperature and outdoor air temperature.

The result using these exemplary methods can reduce IATR variance by a significant amount in comparison to unadjusted IATR values over the same time period. The system can, for a given amount of variance, average over a shorter period of time—thus improving the ability to identify rapidly occurring performance degradation of an HVAC system or similarly continuous degradation of the HVAC system over a longer period of time.

Figure 4A:
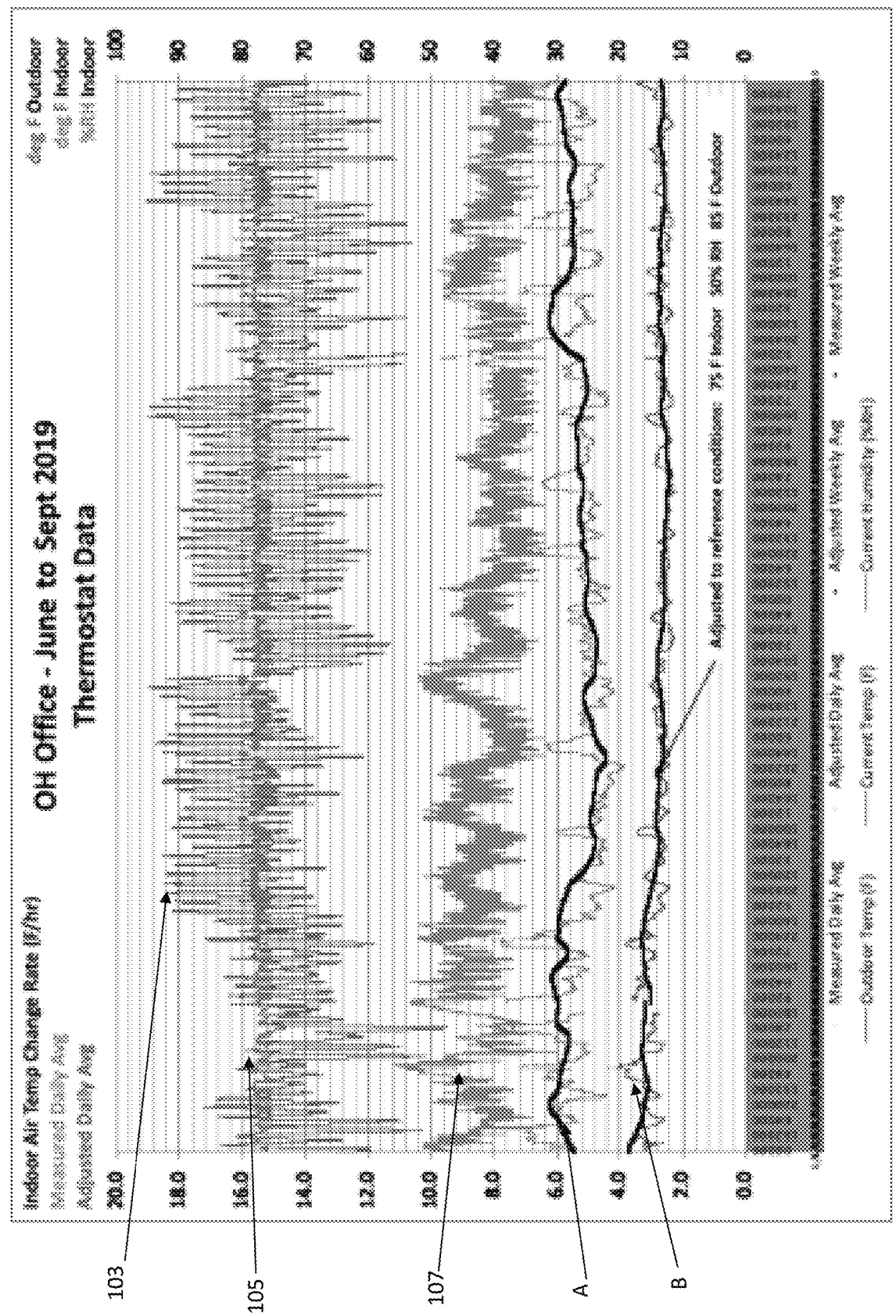
FIG. 4A is a diagram illustrating experimental data obtain from a tested structure in Midwest United States in 2019.

This variance is further illustrated in FIG. 4A, which shows a plot of data from a site in Ohio from May through September of 2019. Curve A near the bottom is a rolling daily average of the measured IATR, while Curve B is a rolling daily average of IATR that has been adjusted for the known sources of variability (IATRadj), including but not limited to indoor air temperature, indoor humidity, and outdoor air temperature. The line running through each curve is the weekly average of the respective IATR values. The other curves are of outdoor air temperature 103, indoor air temperature 105 and indoor relative humidity 107, measured at predetermined increments. In this exemplary embodiment, the measurements are made every five minutes. As illustrated in FIG. 4A, Curve B provides a much more consistent trend line with less variance during the pre-determined testing period.

Figure 4B:
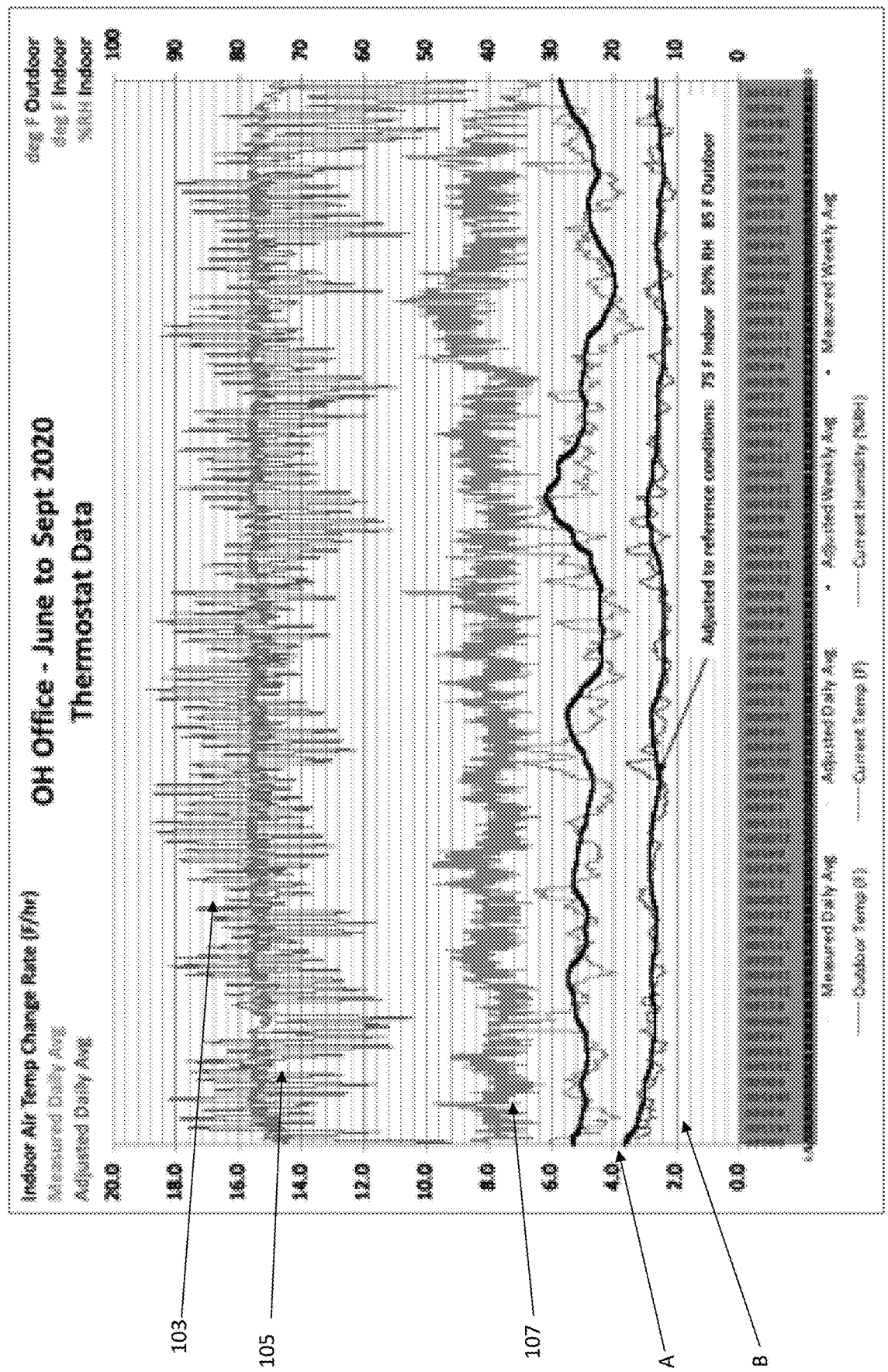
FIG. 4B is a diagram illustrating experimental data obtain from a tested structure from FIG. 4A in 2020.

Furthermore FIG. 4B provides a graphical illustration of measurements during and identical 4-month period of time, wherein the system further utilized the calibration period and data from the measurements shown in FIG. 4A to establish adjustment factors that can be used to further remove variance of the IATRadj value. During the operating period shown in FIG. 4A, the daily average measured variance was about 80.4% and the adjusted variance was about 25.8%. By utilizing the pervious years data from FIG. 4A, the system was able to better reduce this variance, wherein the daily average measured variance was 62.6% with an adjust variance of about 7.7%.

Figure 5A:
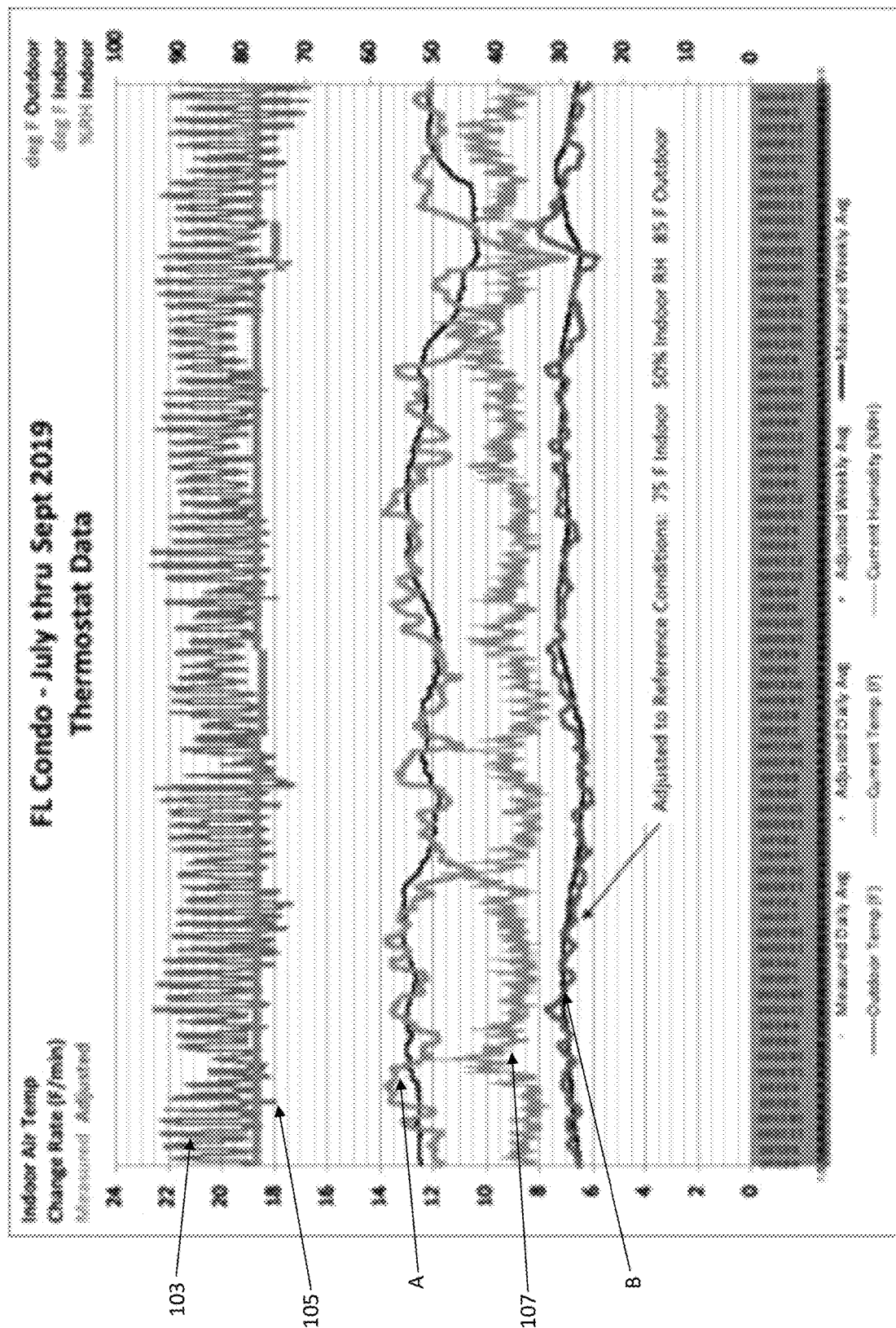
FIG. 5A is a diagram illustrating experimental data obtain from a tested structure in Southeast United States.
Figure 5B:
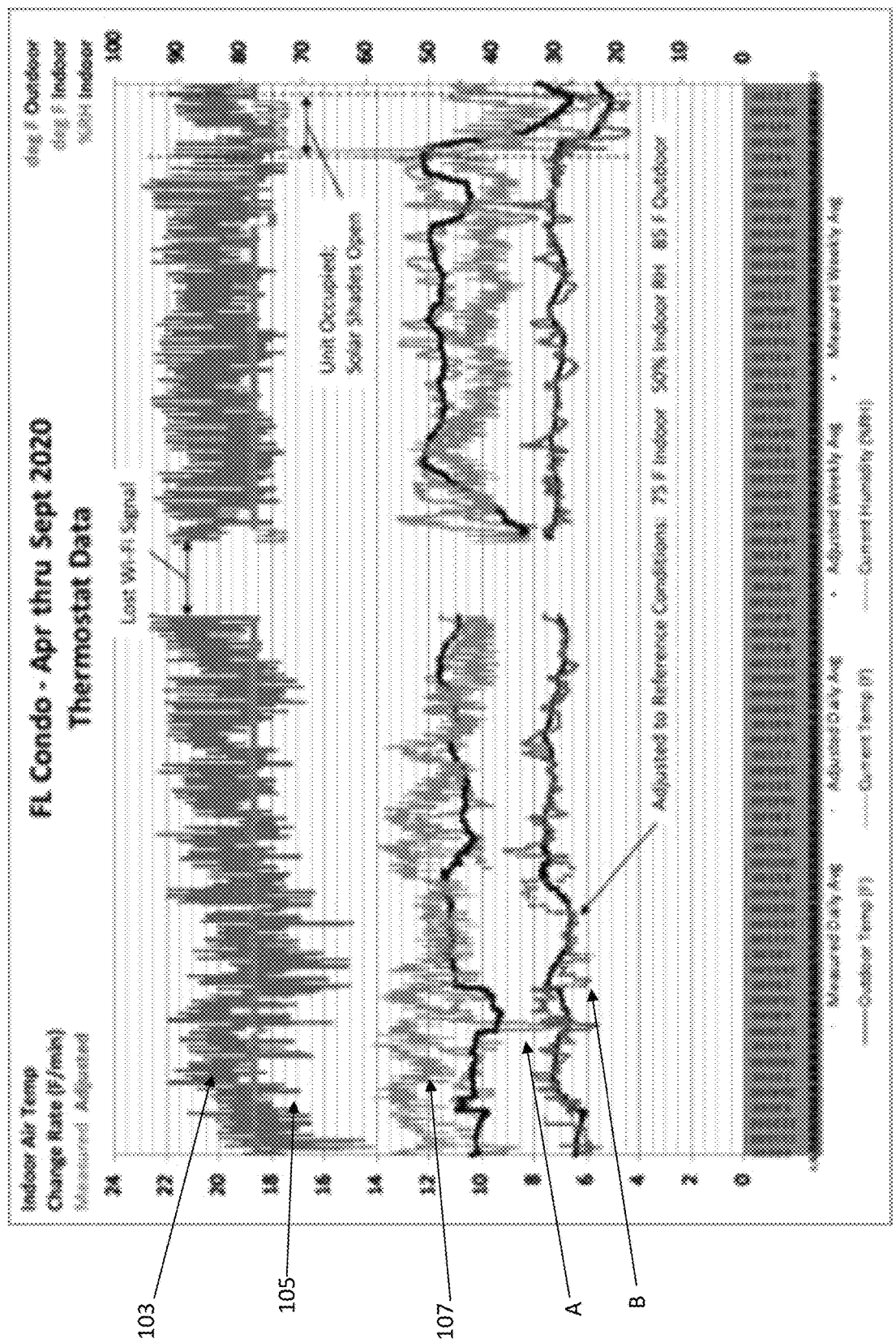
FIG. 5B is a diagram illustrating experimental data obtain from a tested structure from FIG. 5A in 2020.
Figure 6:
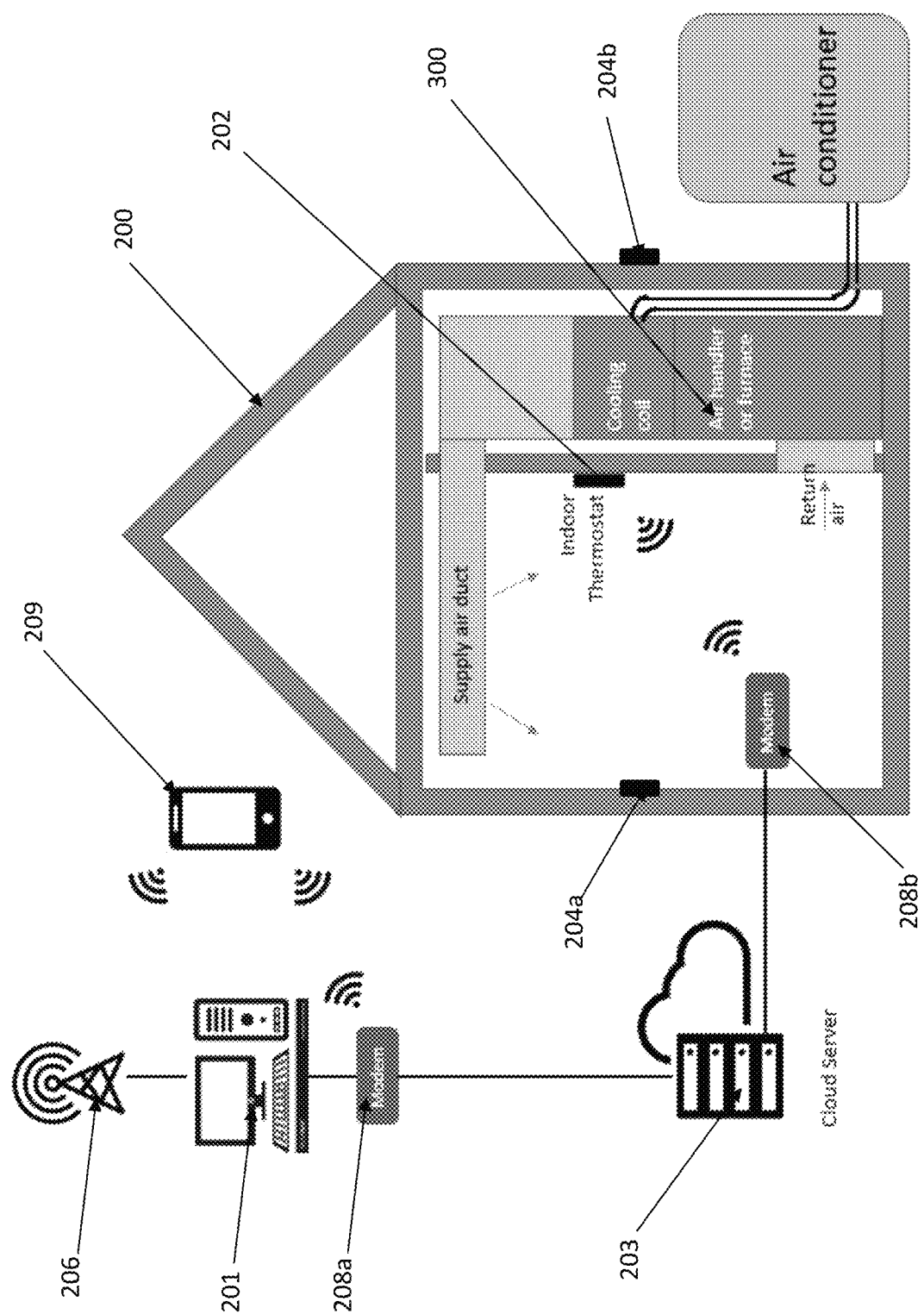
FIG. 6 is an illustration of a schematic of a diagram of an HVAC system according to an exemplary embodiment of the present disclosure.

Similarly, FIG. 5A illustrates a plot of data from a site in Southwest Florida from July to September, where the measured IATR has a much larger variability than the adjusted IATR. This system also has an inherently higher level of adjusted IATR (~7.0 vs ~3.0) than that shown in FIG. 4. This can be attributed to the higher cooling capacity relative to the size of the conditioned space, as compared to the Ohio site. FIG. 5B provides and additional graph showing the same site from FIG. 5A from April 2020 to September 2020. During this period the site had a loss of wireless signal and additional became occupied resulting in a greater variance from the previous year. This site had a daily average measured variance of 103.7% and a daily average adjusted variance of 15.8% in 2019. In 2020, the daily average measured variance was 89.8% while the daily average adjusted variance was 24.3%. As shown, this largely can be attributed to the occupation of the unit and the removal of solar shades by the occupant within site. In some instances, these changes may require a new evaluation period to reset the adjustment factors. Similar to alerting a user of HVAC degradation and drastic change in IATRadj may also trigger an alert to a user to re-calibrate the adjustment factors.

An adjustment module or algorithm can be applied by the monitoring system controller. In some embodiments, the adjustment module can utilize one or more adjustment factors that can be provided as a decimal fraction and can operate as a constant or an equation. In one exemplary method the adjustment factor for OAT can be normalized to 85° and be represented by $$OATadj = (A*OATtarget + B)/(A*OATact + B). \quad \text{Equation 13:}$$

Similarly, adjustment factors for IAT and RH can be represented by $$IATadj = (C*IATtarget + D)/(C*IATact + D), \text{ and} \quad \text{Equation 14:}$$

$$IDRHadj = (E*IDRHtarget + F)/(E*IDRHact + F),$$
respectively. $\quad \text{Equation 15:}$ A similar method can be employed in another polynomial adjustment module/algorithm that can utilize a polynomial form of the adjustment equation, with increasing number of constants that must be solved to minimize IATRadj variance as shown as $$OATadj = (A*OATtarget^3 + B*OATtarget^2 + C*OATtarget + D)/(A*OATact^3 + B*OATact^2 + C*OATact + D) \quad \text{Equation 16:}$$

Similar equations for IATadj and IDRHadj would also be created.

More complex and higher order equations/algorithms may greatly increase the solving complexity and speed; however, a system controller or processor can make such adjustments to determine the adjusted value. A single constant adjustment for OAT, IAT and IDRH can require iterating three values, whereas a single order equation would require iterating six values, a second order equation nine values, and so on.

Figure 7A:
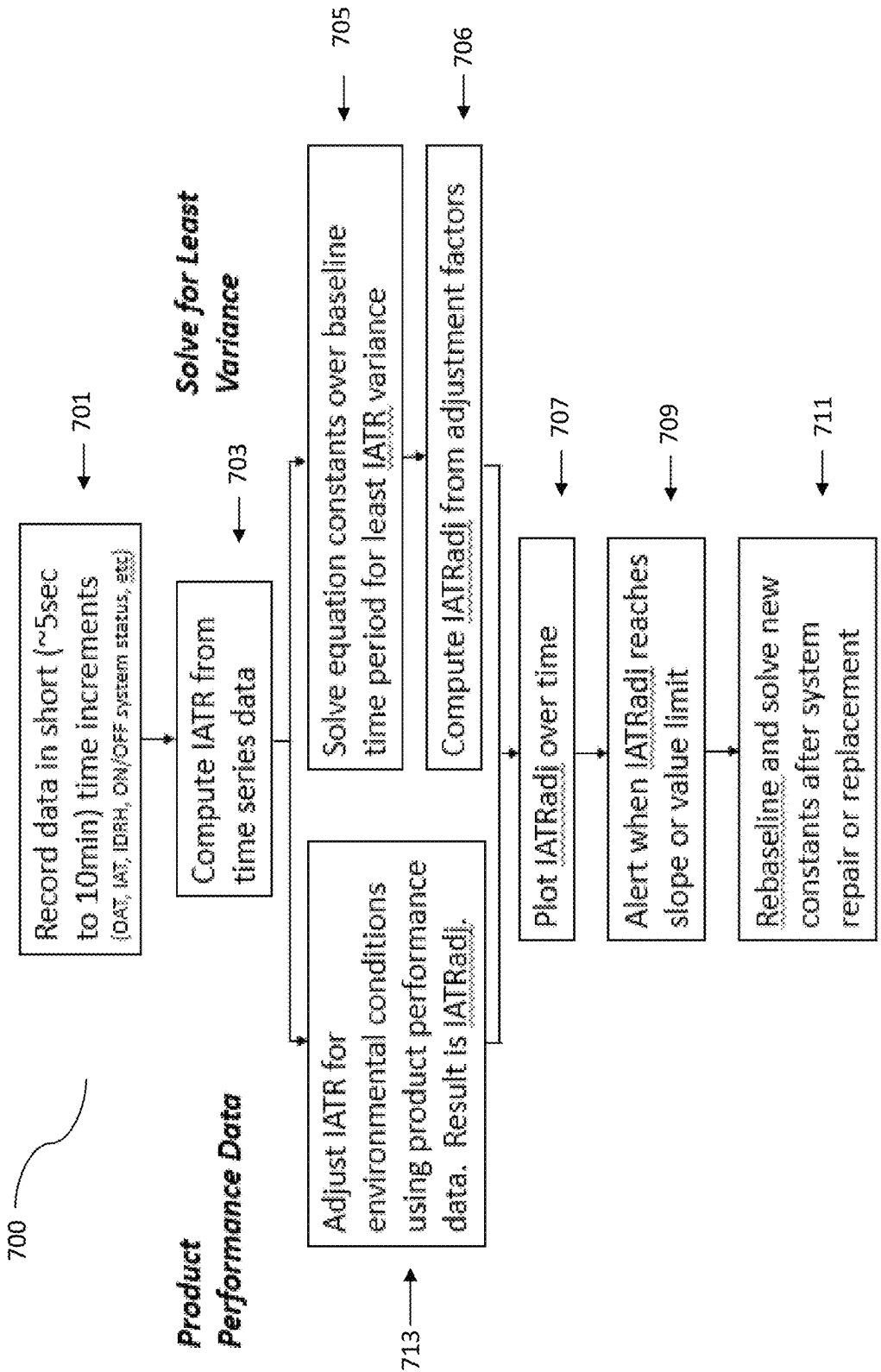
FIG. 7a is a flow diagram of the method for ongoing monitoring system performance of an HVAC system according to an exemplary embodiment of the present disclosure.

FIG. 7A provides an exemplary method 700 for ongoing monitoring HVAC system performance and determining potential failure of the HVAC system using a monitoring system controller communicatively coupled an HVAC system comprising. The monitoring system controller can first initiate a performance evaluation cycle (Step 701) to monitor the operation of an HVAC system using a monitoring system controller. The performance evaluation cycle can first obtain/record data points for various variables (OAT, IAT, IDRH, etc.) in intervals, such as between about 1 second and about 10 minutes, or about 1 minute and 7 minutes, or about 5 minutes, of a predetermined evaluation cycle. The predetermined evaluation cycle can between about 1 day or about 3 months or about 10 days and about 1 month, or about 1 week. Alternatively, the intervals can also potentially be based upon HVAC cycles (heating and cooling). The monitoring system controller can obtain environmental variable data from at least one sensor or database communicatively coupled to the monitoring system controller. The data points can be obtained for a prescribed interval/period, including a time interval or for a certain number of HVAC cycles during the calibration period. The monitoring system controller can then generate a rate of temperature change (IATR) value (Step 703) during a pre-determined baseline time interval. Depending upon the program initialized by the system controller, the system can determine IATRadj in one or more ways, including using product performance data (Step 713) or solve for least variance using equation constants over/adjustment factors established during the baseline period (Step 705). The system can then compute the IATRadj value one or adjustment factors. The monitoring system controller can then generate adjusted rate of temperature change (IATRadj) values at pre-determined intervals during the performance evaluation cycle using a performance analysis algorithm and at least one of the following: obtained environmental data; historical/measured system performance data; or system performance product data from the manufacturer or third party.

Figure 7B:
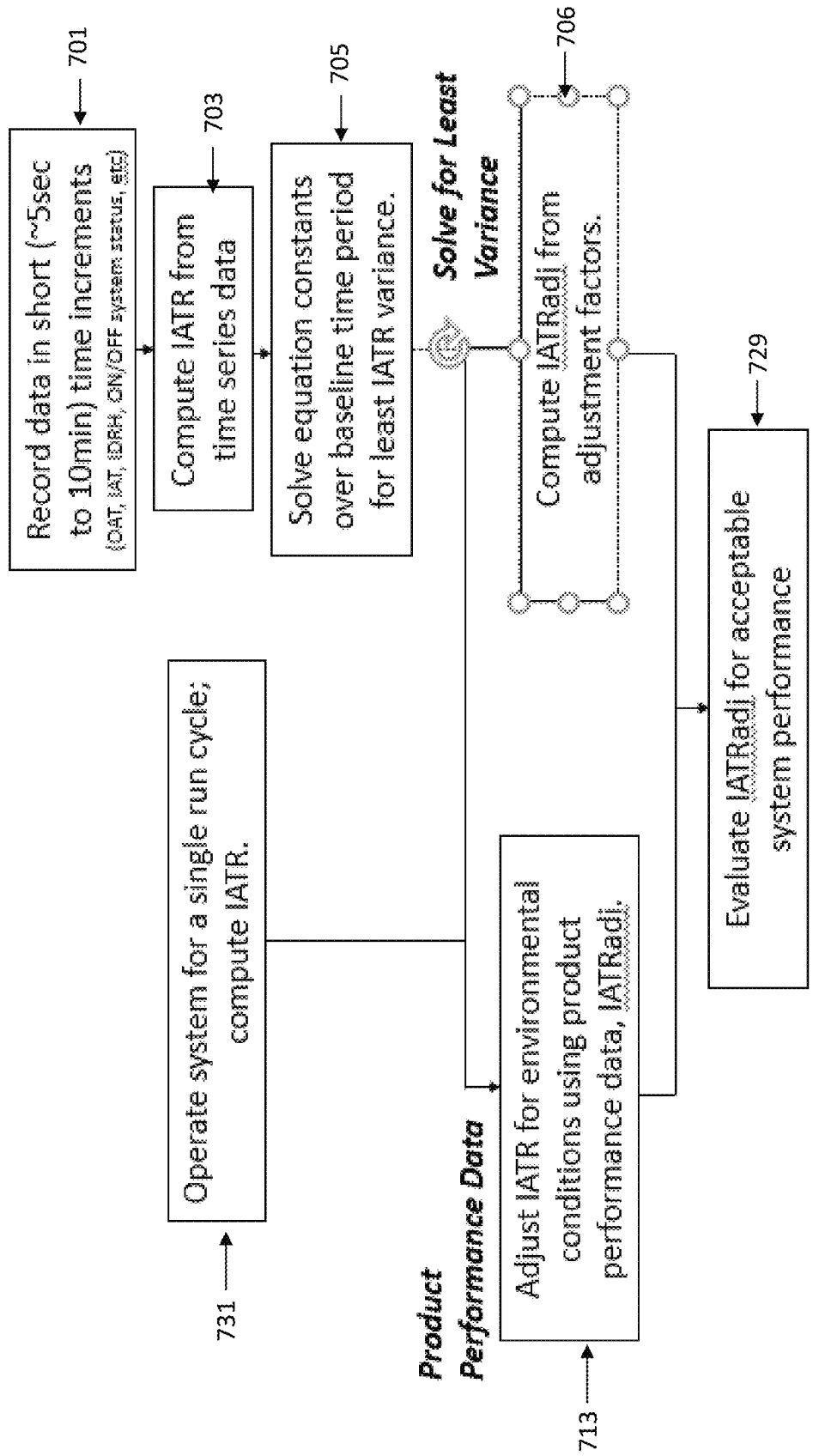
FIG. 7b is a flow diagram of the method for diagnostic monitoring system performance of an HVAC system according to an exemplary embodiment of the present disclosure.

The above operations described in FIG. 7A-B can be included on a computer program product that is embodied on a computer readable medium comprising instructions, when executed by a controller or processor can perform the operations described above including, but not limited to recording data elements in prescribed intervals, determining the IATR from the data elements obtained during the prescribed interval, determining adjustment factors for various data elements over the prescribed time intervals, computing and generating an IATRadj value based upon one or more of the data elements and/or adjustment factors, optionally plotting the IATRadj values overtime, providing an alert to a user when the IATRadj value reaches a prescribed threshold value, and initiating a re-baselining period/protocol to determine new adjustment factors after an HVAC service or change in environmental conditions.

The adjustment in IATR (by solving the IAT, OAT, IDRH adjustment factors) can be done after a minimum period of operation (days, run hours, ON/OFF cycles, etc.) to provide the system controller with an initial period time to establish baseline (i.e., "baselining" period or evaluation period). The user (i.e., HVAC service provider or owner) can define the start of the baselining period as it would coincide with system commissioning or system service. This allows for an assumption of the system to be operating at acceptable performance during the baseline period and can help establish a baseline HVAC system performance value. In some exemplary embodiments, the performance value can be the IATR value.

Once a baseline period has concluded and a baseline HVAC performance value is established, the various IATR adjustment factors may then be applied to future IATRadj data as the various environmental factors are monitored by the system controller. If there is a change in system performance after the baselining period, it will be apparent by way of a change in IATRadj trend. In one example, any degradation in system performance, such as a slow refrigerant leak, can gradually reduce IATRadj such that a minimum alert level or threshold is reached. When this threshold is reached, the system can initiate an alert to a user, such as the homeowner or HVAC specialist that is monitoring the performance of the HVAC system.

In some exemplary embodiment, the system can plot the IATRadj over a period of time or on an ongoing basis (Step 707). If the system plots the data over time it can monitor the ongoing use of the system and determine if the IATRadj is trending in a particular direction that may indicate HVAC system degradation or could potentially be used to predict a failure event. Similarly, the system can transmit the data including the IATRadj to a display for user to monitor. The data can be plotted over a time and displayed as a graph showing the historical and ongoing data obtained by the system for various data elements, including IATRadj, IATR, IAT, OAT, IRHD, among others. The monitoring system controller can also initiate an alert or alarm to a user when the IATRadj value reaches a pre-determined value threshold (Step 709). The alert level can be pre-determined by an HVAC service provider or manufacturer or user and stored on a memory of external database communicatively coupled to the system controller. The system controller can then initiate a notification to a user such as the HVAC servicing contractor, manufacturer, or homeowner. Once a system performance issue has been resolved, the contractor can initiate a new baselining period program to determine new adjustment factors as the system service could result in slightly different performance. The new baseline period data can then be collected and used for future IATR adjustment factors.

Similarly, as shown in FIG. 7B, the method of the present disclosure can be used as a diagnostic by the technician to assess performance before and after service or used by a house inspector to provide a quantitative and direct measure of HVAC system performance. The method may also be applied to other methods using IATR measurements to provide a more stable IATR value in which to apply an alert level, and to widen or eliminate the conditions in which the test is performed. In some exemplary embodiments, a sensor can be a "smart" thermostat that can collect one or more environmental variables. A sensor can be communicatively coupled to the system monitoring controller 201 via any suitable means, such as electronically or via a wireless network 206. In some embodiments, the monitoring controller 201 can be a cloud-based system and/or incorporated into the HVAC controller 202, including but not limited to a "smart" thermostat or thermostat having a transceiver. The HVAC controller may also include its own dedicated memory and processor. The HVAC controller can initiate an HVAC single run cycle to compute the IATR (Step 731). The IATR can be adjusted for environmental conditions/variables using produce performance data to generate the IATRadj (Step 713). Alternatively, and similar to the ongoing testing, the system can initiate a performance evaluation cycle (Step 701) to monitor the operation of an HVAC system using a monitoring system controller 201. The IATR can be computed from the time series data obtained from one or more data elements (Step 703). Adjustment factors, which in some embodiments can include the equation constants illustrated in the above Equations can then be solved for the baseline time period for least IATR variance (Step 705). The IATRadj value can then be computed from the adjustment factors (Step 706).

As the data in FIGS. 4-5 illustrate, the adjusted IATR value (curve B) may still have some variation over time, suggesting that additional factors, such as barometric pressure, outdoor humidity, wind or solar, may aid in further eliminating variation. Similarly, the use of five-minute increment data published by the thermostat API in the tested data may contribute to the variation due to limiting the resolution of the IATR calculations, as compared to data that is published more frequently, such as in a one-minute increment. The data can be obtained in pre-determined intervals from about 1 second intervals to about 10-minute intervals, or about 1-minute intervals to about 5-minute intervals. This can also limit the ability to accurately account for system lag (time from when the cooling system is turned ON to when the air temperature begins to fall). In some exemplary embodiments, the published data can include one or more environmental datasets, including but not limited to IAT, IDRH, OAT and other information that may be provided by the API or sensors. Additional data including the type of system, mode of operation, thermostat settings, and other factors may also be used.

The method of the present disclosure can be implemented in a variety of ways, including a cloud application for a monitoring system that can be implemented through a computing device or system controller 201. In some exemplary embodiments, the computing device can be communicatively coupled to an HVAC system 300, smart thermostat 202, or other smart device. A cloud application can be stored on a memory or a cloud server 203 which can pull data from a thermostat 202 or one or more sensors 204 through a manufacturers API (i.e. API's available to registered third parties), displays the data on a display through any suitable means, such as a web or mobile application, and sends alerts via email, text or mobile notification to a contractor or homeowner's device, or displayed by the HVAC system wall device (user interface or thermostat), or other smart device, such as a phone 209. The system can include one or more modems, processors, routers, or transceivers 208 that are communicatively coupled to one or more other elements of the system, including but not limited to the smart thermostat 202, sensors 204, controller 201, server/memory 203, or smart device 209. All of the following can utilize a wireless network 206 to communicated between the various devices. The method could also be implemented directly by the HVAC system, or at the air distribution vents, so long as there are sensors or connectivity that provides the required data. In some exemplary embodiments, the monitoring system controller 201 can be a cloud-based application housed on an external server or computing device. In other embodiments, the monitoring system controller can be a part of the "smart" thermostat 202, which can communicate through a network to a third-party via a cloud server 203 or other means. The thermostat 202 can have its own dedicated memory or transmit data to a cloud server to store data, algorithms, and other information.

One exemplary embodiment of the system of the present disclosure can include a system controller 201 including a processor in communication with a memory, and one or more sensors communicatively coupled to the system controller. In some exemplary embodiments, a sensor 204 can include a "smart" or wirelessly enabled thermostat 202, smart air vent capable of measuring certain environmental factors, such as the indoor air temperature and the indoor humidity levels of the interior space of a building, or a stand-alone sensor module configured to measure one or more environmental factors. Similarly, a smart thermostat 202 may be communicatively coupled to one or more sensors 204 to obtain additional data elements to be used by the system. In some exemplary embodiments, the one or more sensors 204 can be geographically mapped to a certain location of the environment or structure 200 that can further be used to make any potential adjustments due to additional environmental factors, including but not limited to sun exposure, humidity, and temperature. In some exemplary embodiments, the system controller 201 can also be a smart thermostat 202.

The system controller can also include a transceiver 208 configured to be communicatively coupled to one or more wireless networks 206. The wireless network can send and receive communication for other external sources to the system controller. The external sources can include but are not limited to manufacture performance value data, weather data, one or more exterior sensors, and other databases containing HVAC performance data. Similarly, the HVAC performance data can include measured and/or adjusted historical data from the tested HVAC system, which can be used as a reference or for further establishing a baseline HVAC performance value after system maintenance. The one or more external sources can be used to gather information on one or more of the environmental variables and other information the system controller can use to aid in determining HVAC system performance. In one exemplary embodiment, the thermostat unit includes both the system controller as well as one or more sensors.

In another exemplary embodiment, an HVAC system of the present invention can include a system controller 201 including a processor in communication with a memory, an environment sensor 204, and a communication module 208. It will be appreciated that the indoor temperature and humidity sensor(s) may be external of the system controller 201. In one exemplary embodiment the environment sensor can be a "smart" thermostat that can be communicatively coupled to the system control of the system. The environment sensor can be configured to obtain multiple environmental variables. In one exemplary embodiment, the sensor can obtain the indoor air temperature within the building conditioned by the HVAC system. In one exemplary embodiment, the environmental variables can include the indoor air temperature and indoor humidity. Additionally, other environmental variables can include outdoor air temperature and outdoor humidity. The environmental variable can be used to better accurately model the IATR in the house or building on an ongoing basis. Environmental variables that are external of the conditioned space can be obtained using one ore more sensors, via wireless network database, or through a network connection to one or more real time databases.

In one exemplary embodiment, the system of the present disclosure can include a monitoring system controller configured to continuously monitor one or more environmental variables and the operation of an HVAC system in relation to the variables. The monitoring system can record and store data of one or more environmental variables, such as OAT, IAT, IDRH, and system run status simultaneously. The monitoring system can be set to—record one or more of these variables at a pre-determined time interval, such as between about 1 second to about 10 minutes, or about 5 seconds to about 5 minutes, or about 1 minute to about 2-minute intervals. The monitoring system can then compute and generate an IATR data point for the pre-determined time intervals. The system can then utilize one or more algorithms to adjust the IATR to generate an adjust IATR value (IATRadj). In some embodiments, the system can utilize product performance data or other data to generate IATRadj. In other embodiments, the monitoring system can adjust the for IATR for least variance over the baseline time period using one or more algorithms that can be executed by the system controller.

The system can then map/plot the IATRadj values over time. A user or the system using outside data, such as a manufacturing setting can set a pre-determined threshold or value limit for the IATRadj value. Upon the system reaching the value limit, the system can alert a user or initiate a display to alert a user of the IATRadj value limit being reached. Similarly, the system can use one or more algorithms to predict a timeline for reaching the value limit as the IATRadj value moves over time. In some exemplary embodiments, value limit can correspond to the HVAC system needing to be serviced or evaluated prior to the system failing. After a service of the HVAC system, the system can then initiate a program to re-baseline the system (Step 711).

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method for monitoring performance and determining fault detection of a heating ventilation and air conditioning (HVAC) system, comprising:
    initiating a performance evaluation period through an HVAC controller communicatively coupled to the HVAC system;
    monitoring the operation of the HVAC system using a monitoring system controller;

obtaining baseline data for one or more environmental factors from at least one of the following:
  the HVAC controller communicatively coupled to the monitoring system controller;
  one or more sensors communicatively coupled to the HVAC controller; or
  one or more or databases communicatively coupled to the monitoring system controller;
generating a measured rate of temperature change (IATR) value during the performance evaluation period;
generating an adjusted rate of temperature change (IATRadj) value at intervals during the performance evaluation cycle using a performance analysis algorithm, the IATR value, and
  obtained environmental data; wherein the environmental data comprises:
    indoor air temperature (IAT); indoor relative humidity (IDRH); and outside air temperature (OAT); and one or more of the following:
    historical measured performance data for the HVAC system; or
    manufacturer system performance product data, wherein the generated IATRadj value reduces variability of the IATR value to better evaluate the performance of the HVAC system by utilizing the environmental data as adjustment factors; and
  alerting a user when the IATRadj value reaches a threshold value.

2. The method of claim 1, wherein the HVAC system includes an HVAC controller communicatively coupled to the monitoring system controller.

3. The method of claim 1, wherein the system monitoring controller generates an adjustment factor for the one or more environmental factors based on the data obtained during the performance evaluation period to minimize the variance of the IATRadj value.

4. The method of claim 1, wherein the IATRadj value is calculated using the following equation: IATRadj=IATRmeasured*f (IAT, IDRH, OAT).

5. The method of claim 2, wherein the environmental factors include at least one of the following:
  barometric pressure, outdoor humidity, wind exposure or solar exposure.

6. The method of claim 1, wherein the database includes a weather database for obtaining outside air temperature.

7. The method of claim 1, wherein the baseline data is obtained by the monitoring system controller when the HVAC system is operating a heating or cooling cycle for a predetermined interval.

8. The method of claim 1, wherein the baseline data is provided to the monitoring system controller via the HVAC controller, and wherein the baseline data is stored on a memory.

9. The method of claim 1, wherein one or more baseline data values is provided to the monitoring system controller via an external source.

10. The method of claim 1, wherein the intervals range from one second to five-minutes.

11. The method of claim 1, wherein the IATRadj value is calculated using the following equation: IATadj*IDRHadj*OATadj*IATRmeasured.

12. The method of claim 3, wherein the adjusted IATR value generated using an algorithm to minimize IATR variability utilizing one or more of the adjustment factors.

13. The method of claim 1, wherein the performance evaluation period is selected from one of the following:
  a pre-determined interval;
  a pre-determined number of heating or cooling cycles; or
  a number of heating or cooling cycles until a IATRadj variance limit value is reached.

14. The method of claim 11, wherein the HVAC controller is a wireless enabled thermostat.

15. The method of claim 1, wherein the performance analysis algorithm is configured to generate the IATRadj by solving one or more constants over the performance evaluation period for least IATR variance.

* * * * *